(12) United States Patent
Fuse et al.

(10) Patent No.: US 7,529,699 B2
(45) Date of Patent: May 5, 2009

(54) ACCOUNTING SYSTEM

(75) Inventors: Satoshi Fuse, Osaka (JP); Hiroshi Tarewaki, Hirakata (JP); Fumio Kunimitsu, Ikoma-gun (JP)

(73) Assignee: Panasonic Corporation, Osaka (JP)

( * ) Notice: Subject to any disclaimer, the term of this patent is extended or adjusted under 35 U.S.C. 154(b) by 998 days.

(21) Appl. No.: 10/826,998

(22) Filed: Apr. 19, 2004

(65) Prior Publication Data

US 2004/0254880 A1 Dec. 16, 2004

(30) Foreign Application Priority Data

Apr. 18, 2003 (JP) ............................. 2003-114765

(51) Int. Cl.
G07B 17/00 (2006.01)
H04M 15/00 (2006.01)
G06Q 40/00 (2006.01)

(52) U.S. Cl. ........................ 705/30; 705/34; 705/40

(58) Field of Classification Search .................. 705/30, 705/40, 45, 34
See application file for complete search history.

(56) References Cited

U.S. PATENT DOCUMENTS

| | | | | |
|---|---|---|---|---|
| 5,943,656 | A * | 8/1999 | Crooks et al. ................. | 705/30 |
| 6,078,907 | A * | 6/2000 | Lamm ........................... | 705/40 |
| 6,532,450 | B1 * | 3/2003 | Brown et al. .................. | 705/40 |
| 7,206,768 | B1 * | 4/2007 | deGroeve et al. .............. | 705/54 |

FOREIGN PATENT DOCUMENTS

| JP | 11-203373 | | 7/1999 |
|---|---|---|---|
| JP | 2002366722 | A * | 12/2002 |
| JP | 2004118524 | A * | 4/2004 |

OTHER PUBLICATIONS

Tomatsu Consulting Group, Design for a Consolidated Accounting System, published by Chuokeizai-Sha, Inc., issued Jun. 5, 1997, and English Translation (Computer Translation).*
Wiley, Generally accepted accounting Principles, 2000 Patrick Delaney, Barry Epstein,James adler, Michael Foran.*
How Motorola closes its books in two days Ettore, Barbara Management Review v84n3 pp. 40-44 Mar. 1995.*

* cited by examiner

*Primary Examiner*—Daniel S Felten
*Assistant Examiner*—William E Rankins

(57) ABSTRACT

An accounting system structured from a biller accounting device 100 connected to a database DB1 and a billee accounting device 200. Biller accounting device 100 sequentially receives input of billing data, some of which may be for appropriation in consolidated accounting, enters received billing data in database DB1, extracts any billing data not for appropriation from received billing data, outputs extracted billing data to billee accounting device 200, and excludes specified billing data entered in database DB1 from being appropriated. Billee accounting device 200 receives outputted billing data and notifies biller accounting device 100 of the receipt, and biller accounting device 100 excludes, as the specified billing data, billing data whose receipt is notified.

15 Claims, 18 Drawing Sheets

FIG.3

| BDAT- ID INFORMATION | 01 | 02 | 03 | ..... |
|---|---|---|---|---|
| BILLER ID INFORMATION | COMPANY A | COMPANY A | COMPANY D | ..... |
| BILLEE ID INFORMATION | COMPANY B | COMPANY C | COMPANY A | ..... |
| AMOUNT INFORMATION | ¥4.7 MILL | ¥6.5 MILL | ¥10.7 MILL | ..... |
| USAGE INFORMATION | MATERIAL A COST | MATERIAL B COST | MACHINERY COST | ..... |
| NR FLAG | RECEIVED | UNRECEIVED | UNRECEIVED | ..... |
| CLR FLAG | CLEARED | UNCLEARED | UNCLEARED | ..... |
| CREDIT INFORMATION | — | ¥6.5 MILL | — | ..... |
| DEBIT INFORMATION | ¥4.7 MILL | — | ¥10.7 MILL | ..... |

| BDAT- ID INFORMATION | 01 | 041 | 042 | ... |
|---|---|---|---|---|
| BILLER ID INFORMATION | COMPANY A | COMPANY A | COMPANY D | ... |
| BILLEE ID INFORMATION | COMPANY B | COMPANY C | COMPANY A | ... |
| AMOUNT INFORMATION | ¥4.7 MILL | ¥17 MILL | ¥27.7 MILL | ... |
| USAGE INFORMATION | MATERIAL A COST | MATERIAL B COST | MACHINERY COST | ... |
| FAR FLAG | RECEIVED | UNRECEIVED | UNRECEIVED | ... |
| CLR FLAG | CLEARED | UNCLEARED | UNCLEARED | ... |
| CREDIT INFORMATION | — | — | ¥27.7 MILL | ... |
| DEBIT INFORMATION | ¥4.7 MILL | ¥17 MILL | — | ... |

```
COMPANY A:
FINANCIAL REPORT

JUNE

CREDIT AMOUNT      ¥1.65 BILL
DEBIT AMOUNT       ¥1.47 BILL
ACCOUNT BALANCE    ¥180 MILL
```

FIG.6

```
COMPANY B:
FINANCIAL REPORT

JUNE

CREDIT AMOUNT      ¥11.298 BILL
DEBIT AMOUNT       ¥9.765 BILL
ACCOUNT BALANCE    ¥1.533 BILL
```

FIG.11

| BILLER | BILLEE |
|---|---|
| FART LIST ||
| COMPANY A | COMPANY B<br>COMPANY C<br>·<br>·<br>·<br>COMPANY W |
| COMPANY B | COMPANY A<br>COMPANY C<br>·<br>·<br>·<br>COMPANY Z |

EPCCH SYSTEM
MENU   ENTRY   CONT. ENTRY   STANDARDIZE                        MAIN MENU
EXPENDITURE BILLING (NEW) BILLING INPUT

CURR.         BILL MTH  [2002/06 ▼]   [●] FULL-AMOUNT RECEIPT BILLING  [○] MINUS BILLING (DEBIT APPROP.)
INFO.         CURRENCY  [JPY] [YEN]
              CONV.TYPE [   ▼]        CONVERSION RATE [        ]  [SEARCH]
              OUR RESV. NO. [       ]  OUR RESV. TOTAL [        ]

BILLER        BOP CODE  [00020000]   [COMPANY A]
              DEPT.     [PERSONNEL]
              PIC       [TANAKA]
              CONTACT   [          ]
              BILL NO.  [B0000011]

[COPY] [INPUT] [DELETE]

| COMPANY | | DEPT. | DESC. | ITEM | TOTAL | TAX |
|---|---|---|---|---|---|---|
| 00030000 | COMPANY B | PERSONNEL | PAYROLL | ABC | 500,000 | |

FIG.14A

| BILLER BOP CODE | 00020000 (COMPANY A) |
|---|---|
| BILL NO. | B0000011 |
| BILLER DEPT./PIC | PERSONNEL/TANAKA |
| BILL DATE | 2002/05/30 |
| BILLEE BOP CODE | 00030000 (COMPANY B) |
| BILLEE DEPT./PIC | PERSONNEL/YANAGISAWA |
| BILLING AMOUNT | 500,000 |
| BILLING DESC. | PAYROLL |

FIG.14B

| BILLER BOP CODE | 00020000 (COMPANY A) |
|---|---|
| BILL NO. | B0000011 |
| BILLEE BOP CODE | 00030000 (COMPANY B) |
| BILLEE DEPT./PIC | PERSONNEL/YANAGISAWA |
| BILL RECEIVED BY: | ACCOUNTING/INAMOTO |
| BILLING AMOUNT | 500,000 |
| FAR FLAG | RECEIVED |
| FAR NO. | A0000200 |

FIG.14C

| BILLER BOP CODE | 00030000 (COMPANY B) |
|---|---|
| BILLER DEPT./PIC | PERSONNEL/YANAGISAWA |
| RECEIPT NO. | C0000200 |
| BILLEE BOP CODE | 00040000 (COMPANY D) |
| BILLING NO. | B0000014 |
| FAR NO. | |
| BILLING AMOUNT | 1,800,000 |
| BILLING DESC. | PAYROLL |
| APPROVED BY: | ACCOUNTING/INAMOTO |
| FAR FLAG | UNRECEIVED |

FIG.15

EPCCH SYSTEM

BACK   PRINT   NEXT   PRIOR           MAIN MENU

EXPENDITURE EDI RECEIPT (RECEIPT/DISTRIB.)

BOP CODE   00030000   COMPANY B
CLICK ON BUTTON OF DATA FOR DEPARTMENT DISTRIBUTION

| DEPT. CODE | RECEIPT | BILLER INFORMATION | | BILL | | | | |
| --- | --- | --- | --- | --- | --- | --- | --- | --- |
| | | BOP CODE | | BILL NO. | BILL DATE | DEPT. | PIC | CURR. | TOTAL |
| 09000 | ☐ | 00020000 | COMPANY A | B0000011 | 06/30 | PERSONNEL | TANAKA | JPY | 500,000 |

FIG.16

EPCCH SYSTEM

MENU   ENTRY   CONT. ENTRY   STANDARDIZE

EXPENDITURE EDI RECEIPT (NEW) RECEIPT INPUT

MAIN MENU

CURR. INFO.

FAR NO. [A0000200] ▼ MONTH [2002/06] ▼  [⦿] FULL-AMOUNT RECEIPT BILLING  ○ MINUS BILLING (DEBIT APPROP.)

CURRENCY [JPY] YEN

CONV.TYPE [ ] ▼   CONVERSION RATE [ ]   [SEARCH]

OUR RESV. NO. [ ]   OUR RESV. TOTAL [ ]

BILLER

BOP CODE [00020000]

DEPT. [PERSONNEL]

PIC [TANAKA]

CONTACT [ ]

BILL NO. [B0000011]

[COPY]  [INPUT]  [DELETE]

| COMPANY | DEPT. | DESC. | ITEM | TOTAL | TAX |
|---|---|---|---|---|---|
| 00030000 COMPANY B | PERSONNEL | PAYROLL | ABC | 500,000 | |
| | | | | | |
| | | | | | |
| COMPANY A | | | | | |

FIG.17

| BILLER BOP CODE | 00020000 | 00020000 | ... |
|---|---|---|---|
| BILLING NO. | B0000011 | B0000012 | ... |
| BILLER DEPT./PIC | PERSONNEL/TANAKA | PRODUCTION/TASHIRO | ... |
| BILL DATE | 2002/05/30 | 2002/06/01 | ... |
| BILLEE BOP CODE | 00030000 | 00040000 | ... |
| BILLEE DEPT./PIC | PERSONNEL/YANAGISAWA | PLANT/YAMADA | ... |
| BILLING AMOUNT | 500,000 | 1,000,000 | ... |
| DESC. | PAYROLL | RAW MATERIAL COST | ... |
| FAR FLAG | RECEIVED | UNRECEIVED | ... |
| CLR FLAG | CLEARED | UNCLEARED | ... |
| CREDIT AMOUNT | 500,000 | 1,000,000 | ... |
| DEBIT AMOUNT | | | |

FIG.18

| | | | |
|---|---|---|---|
| BILLER BOP CODE | 00020000 | 00030000 | ... |
| BILLING NO. | B0000011 | C0000018 | ... |
| BILLER DEPT./PIC | PERSONNEL/TANAKA | INDUSTRIAL TECHNOLOGY | ... |
| BILL DATE | 2002/05/30 | 2002/06/01 | ... |
| BILLEE BOP CODE | 00030000 | 00040000 | ... |
| BILLEE DEPT./PIC | PERSONNEL/YANAGISAWA | PLANT/OSAWA | ... |
| BILLING AMOUNT | 500,000 | 1,500,000 | ... |
| DESC. | PAYROLL | SETUP COST | ... |
| FAR FLAG | RECEIVED | UNRECEIVED | ... |
| CLR FLAG | CLEARED | UNCLEARED | ... |
| CREDIT AMOUNT | | 1,500,000 | ... |
| DEBIT AMOUNT | 500,000 | | |

ACCOUNTING SYSTEM

BACKGROUND OF THE INVENTION

1. Field of the Invention

The present invention relates to an accounting system, and in particular to technology for speeding up the accounting when preparing a financial report for an entire group corporation consisting of a plurality of companies.

2. Related Art

In recent years, commercial transactions between member corporations within group corporations have become large-scale and extremely complicated. Corporate evaluation of these corporations using consolidated accounting for the entire group corporation, rather than non-consolidated accounting conducted separately for each corporation, has internationally become the norm, with the importance of consolidated accounting also being gradually recognized in Japan in recent years.

The difference between non-consolidated and consolidated accounting is discussed briefly here. With non-consolidated accounting, for example, if Company A bills Company B for 100 dollars, Company B appropriates 100 dollars as a debit amount relating to Company A, and Company A appropriates 100 dollars as a credit amount relating to Company B. This results in a sale based on the transaction with Company B appearing on Company A's financial report, and an expenditure based on the transaction with Company A appearing on Company B's financial report.

In contrast, with consolidated accounting, companies A and B are considered as a single group corporation, and a financial report is prepared with Company A's 100 dollar credit with respect to Company B and Company B's 100 dollar debit with respect to Company A offsetting one another. Thus, with the financial report for the entire group corporation that includes Company A and Company B, the respective sale and expenditure based on the transaction between companies A and B are eliminated.

Here, "elimination" refers to the non-appropriation of credits and debits in the financial report for an entire group corporation, due to the offsetting, in the accounting process for the entire group corporation, of debits and credits provisionally appropriated in the accounting between individual corporations within the group corporation based on commercial transactions between these corporations.

To implement this elimination, complicated and time-consuming processing is needed in the accounts department of individual corporations to careful examine and approve the billing content (see Japanese Patent Publication No. 11-203373).

In recent years, corporations in Japan have been rapidly diversifying and internationalizing, as seen in the expansion of economic activities and the procurement of overseas capital now being actively pursued. Also, the environment in which corporations operate has changed remarkably, with the increasing participation of foreign investors in the Japanese share market, for instance, and, together with the strengthening trend in corporations towards recognizing the importance of consolidated accounting, the demand for consolidated information from investors in order to precisely infer to risks and returns borne by industry groups is on the increase. In particular, the prompt presentation of financial reports for group corporations is an important element in strengthening investor trust, and also in deciding the timing and amount of investments.

However, the elimination of appropriated credits and debits arising from commercial transactions between individual corporations within a group corporation is, as mentioned above, a time-consuming process and one of the primary factors delaying the preparation of financial reports for entire group corporations.

SUMMARY OF THE INVENTION

In view of the above issues, the present inventions aims to provide an accounting system that allows for the speeding up of consolidated accounting when preparing a financial report for an entire group corporation consisting of a plurality of companies, with respect to investors and the like.

To realize this object, an accounting system pertaining to the present invention includes a bill-issuing device and a bill-receiving device. The bill-issuing device is connected to a database and includes: a first receiving unit operable to sequentially receive input of (i) billing data for appropriation in consolidated accounting and (ii) billing data not for appropriation in consolidated accounting; an entry unit operable to enter the received billing data in the database; an extraction unit operable to extract billing data not for appropriation from the received billing data; an output unit operable to output the extracted billing data to the bill-receiving device; and an exclusion unit operable to clear specified billing data entered in the database, as billing data not for appropriation, and to exclude the specified billing data that has been cleared from being appropriated. The bill-receiving device includes: a second receiving unit operable to receive the billing data outputted from the bill-issuing device; and a notification unit operable to notify the bill-issuing device of the receipt of the billing data. Here, the exclusion unit excludes the billing data whose receipt is notified, as the specified billing data.

Alternatively, an accounting system pertaining to the present invention may include a bill-issuing device connected to a first database, a server connected to a second database that stores an exclusion list showing a correspondence between a biller and a billee that are not targeted for consolidated accounting, and a bill-receiving device. The bill-issuing device may include: a first receiving unit operable to sequentially receive input of (i) billing data for appropriation in consolidated accounting and (ii) billing,data not for appropriation in consolidated accounting; a first transmission unit operable to transmit received billing data to the server; an entry unit operable to enter received billing data in the first database; and an exclusion unit operable to clear specified billing data entered in the database, as billing data not for appropriation, and to exclude the specified billing data that has been cleared from being appropriated. The server may include: a second receiving unit operable to receive the billing data transmitted from the bill-issuing device; a judgment unit operable to judge whether the received billing data is for appropriation, depending on whether the biller and billee of the billing data are shown in the exclusion list; and a second transmission unit operable to transmit the received billing data to the bill-receiving device if judged to be not for appropriation. The bill-receiving device may include: a third receiving unit operable to receive the billing data transmitted from the server; and a notification unit operable to notify the bill-issuing device of the receipt of the billing data. Here, the exclusion unit may exclude the billing data whose receipt is notified, as the specified billing data.

Also, the bill-issuing device and the bill-receiving device may each be a plurality of communication terminals operable to intercommunicate via a telecommunication circuit.

A method pertaining to the present invention is used by a bill-issuing device that is connected to a database and included in an accounting system that further includes a bill-receiving device. The method includes the steps of: receiving input of (i) billing data for appropriation in consolidated accounting and (ii) billing data not for appropriation in consolidated accounting; entering the received billing data in the database; extracting billing data not for appropriation from the received billing data; outputting the extracted billing data to the bill-receiving device; and clearing outputted billing data whose receipt is notified by the bill-receiving device, as billing data not for appropriation, and excluding the cleared billing data from being appropriated.

Also, a bill-issuing program pertaining to the present invention is used by a bill-issuing device that is connected to a database and included in an accounting system that further includes a bill-receiving device. The bill-issuing program includes the steps of: receiving input of (i) billing data for appropriation in consolidated accounting and (ii) billing data not for appropriation in consolidated accounting; entering the received billing data in the database; extracting billing data not for appropriation from the received billing data; outputting the extracted billing data to the bill-receiving device; and clearing outputted billing data whose receipt is notified by the bill-receiving device, as billing data not for appropriation, and excluding the cleared billing data from being appropriated.

Furthermore, a computer-readable recording medium pertaining to the present invention has recorded thereon a bill-issuing program used by a bill-issuing device that is connected to a database and included in an accounting system which further includes a bill-receiving device. The bill-issuing program includes the steps of: receiving input of (i) billing data for appropriation in consolidated accounting and (ii) billing data not for appropriation in consolidated accounting; entering the received billing data in the database; extracting billing data not for appropriation from the received billing data; outputting the extracted billing data to the bill-receiving device; and clearing outputted billing data whose receipt is notified by the bill-receiving device, as billing data not for appropriation, and excluding the cleared billing data from being appropriated.

According to this configuration, billing data, when not for appropriation, is accepted without scrutiny of the content thereof and excluded from being appropriated for consolidated accounting, thus enabling the billee to quickly eliminate credits appropriated on the basis of commercial transactions between individual corporations within a group corporation, and quickly prepare a financial report for the entire group corporation, with respect to investors.

Here, an accounting system as described above may further include a calculation device operable to calculate a consolidated accounting amount, based on the billing data entered in the database not excluded by the exclusion unit from being appropriated.

Also, an accounting system as described above may further include a calculation device operable to calculate a consolidated accounting amount, based on the billing data entered in the first database not excluded by the exclusion unit from being appropriated.

Alternatively, a bill-issuing device as described above may further include a calculation unit operable to calculate a consolidated accounting amount, based on the billing data entered in the first database not excluded by the exclusion unit from being appropriated.

Since it is possible, according to this configuration, to calculate a consolidated closing account after excluding billing data not for appropriation from the calculation, the consolidated closing account can be calculated without performing unnecessary operations.

Here, the bill-issuing device and the bill-receiving device may be connected by a telecommunication circuit, the extraction unit may include a judgment subunit operable to judge whether received billing data is for appropriation, and the output unit may include an online transmission subunit operable to transmit online to the bill-receiving device, only billing data extracted as billing data not for appropriation.

Also, the database may store an exclusion list showing a correspondence between a biller and a billee that are not targeted for consolidated accounting, and the judgment subunit may judge received billing data to be not for appropriation if the biller and billee of the billing data are shown in the exclusion list.

Furthermore, the bill-issuing device, the server, and the bill-receiving device may be connected by a telecommunication circuit, and the second transmission unit may transmit online to the bill-receiving device, only billing data judged to be not for appropriation.

According to this configuration, it is automatically judged whether billing data is for appropriation, and when this is the case (i.e. when not for appropriation), the billing data is transmitted to the billee using a transmission method, with this fact made identifiable, thus enabling the billee to easily identify billing data not for appropriation, and for accounting operations to proceed smoothly.

Here, the bill-issuing device, the server, and the bill-receiving device may be connected by a telecommunication circuit, and the second transmission unit may transmit online to the bill-receiving device, only billing data judged to be not for appropriation.

Also, the notification unit may perform the notification online in realtime.

Since the bill-issuing device, according to this configuration, is immediately notified on receipt by the bill-receiving device of billing data not for appropriation, the bill-issuing device is able to quickly exclude billing data not for appropriation from being appropriated.

Here, a bill-receiving device pertaining to the present invention may be connected to a database and receive (i) billing data for appropriation in consolidated accounting and (ii) billing data not for appropriation in consolidated accounting. The bill-receiving device may include: a first entry unit operable to enter received billing data not for appropriation in the database; an exclusion unit operable to exclude billing data entered in the database from being appropriated; an approval unit operable to approve received billing data based on an input from a user; and a second entry unit operable to enter approved billing data for appropriation in the database.

According to this configuration, billing data, when not for appropriation, is accepted without scrutiny of the content thereof and excluded from being appropriated for consolidated accounting, thus enabling the billee to quickly eliminate credits appropriated on the basis of commercial transactions between individual corporations within a group corporation, and quickly prepare a financial report for the entire group corporation, with respect to investors.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings:

FIG. 3 shows a specific example of a credit/debit table 110 stored in a database DB1;

FIG. 4 shows a specific example of a credit/debit table 210 stored in a database DB2;

FIG. 5 shows a specific example of a consolidated financial report prepared by a report preparation unit 3002;

FIG. 6 shows a specific example of a consolidated financial report prepared by a report preparation unit 4002;

FIG. 11 shows a specific example of a full-amount receipt target list 403 entered in a database DB3;

FIG. 13 shows an input screen for generating billing data for display by a biller terminal 501

FIG. 14A shows a specific example of generated billing data;

FIG. 14B shows a specific example of receipt data;

FIG. 14C shows a specific example of transaction data after approval;

FIG. 15 shows a specific example of billing data displayed on a display monitor of a billee terminal 503 equating to billing-data reception unit 201, on receipt of billing data relating to a full-amount receipt agreement target, transmitted from server 506;

FIG. 16 shows a specific example of a screen for inputting a full-amount receipt flag and a full-amount receipt number;

FIG. 17 shows a specific example of journal data generated by a biller master terminal 501A;

FIG. 18 shows a specific example of journal data generated by a billee master terminal 503A.

DETAILED DESCRIPTION OF THE PREFERRED EMBODIMENTS

Embodiments of the present invention are described in detail below using the drawings.

Embodiment 1

Figure 1:
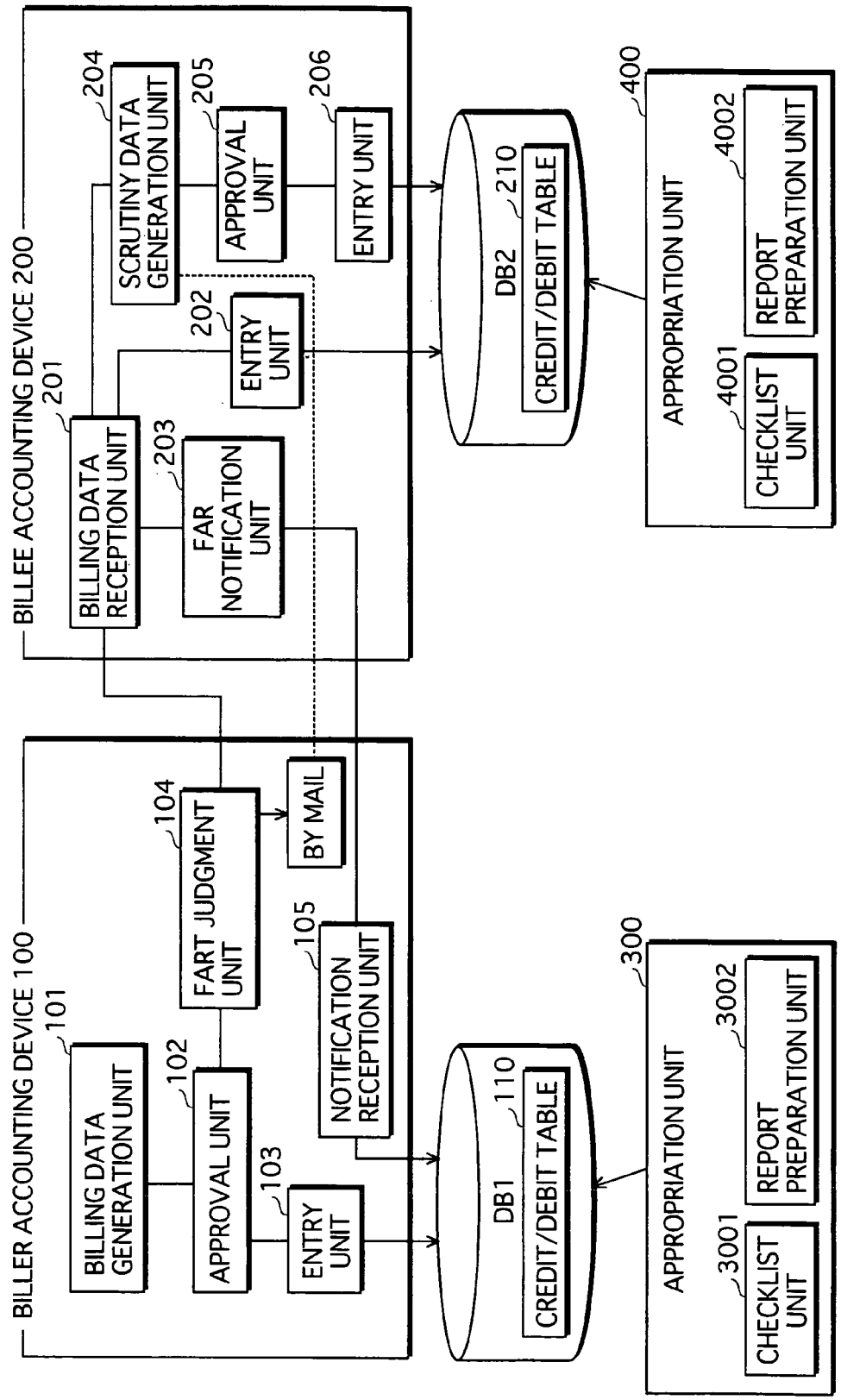
FIG. 1 is a functional block diagram of an accounting system KS1 in an embodiment 1 of the present invention.

FIG. 1 is a functional block diagram of an accounting system KS1 according to the present embodiment.

Accounting system KS1 is constituted from a biller accounting device 100, a billee accounting device 200, appropriation devices 300 and 400, and databases DB1 and DB2.

Biller Accounting Device 100

Biller accounting device 100 is constituted from a billing-data (BDAT) generation unit 101, an approval unit 102, an entry unit 103, a full-amount receipt target (FART) judgment unit 104, and a notification reception (NR) unit 105.

Figure 2:
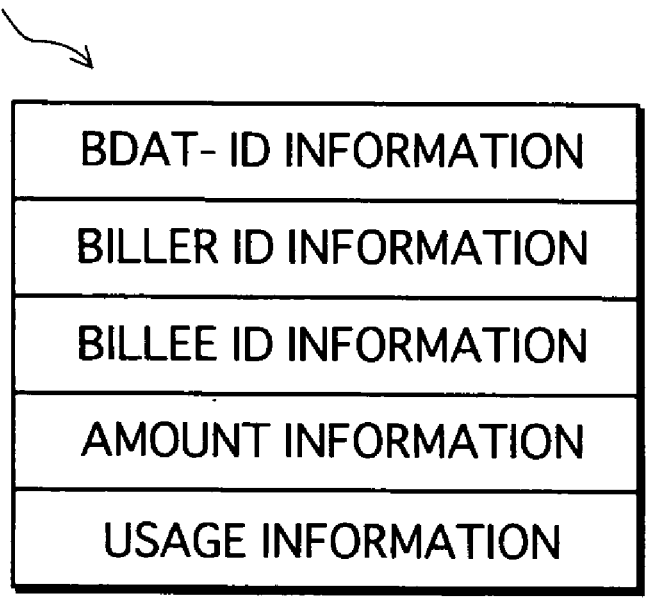
FIG. 2 shows a data structure of billing data (biller)

BDAT generation unit 101 generates billing data based on input data from a user. Generated billing data indicates a billing amount, and the company that applies biller accounting device 100 (hereinafter, "home company") is the billing party (hereinafter, "biller") of the billing data. Billing data, as shown in FIG. 2, includes billing-data identification (BDAT-ID) information, biller identification (ID) information, billee identification (ID) information, amount information, and usage information.

BDAT-ID information identifies the billing data, biller ID information identifies the biller, and billee ID information identifies the billed party (hereinafter, "billee"). Amount information shows a billing amount in monetary terms, and usage information shows remarks relating to the billing amount.

Approval unit 102 approves billing data generated by BDAT generation unit 101, based on inputs from the user. Approved billing data is passed on to entry unit 103 and FART judgment unit 104. Specifically, processing is performed in unit 102 to check for errors in the billing data. If there are no errors, the generated billing data is passed on to units 103 and 104 without alteration, as billing data whose content has been approved. If there is an error, billing data whose content has been corrected on the basis of user inputs is passed on to units 103 and 104 as approved billing data.

Also, approval unit 102 receives inputs from the user of billing data whose biller is another company, and approves this billing data based on user inputs.

Entry unit 103 writes billing data received from approval unit 102 to a credit/debit (CR/DB) table 110 stored in a database DB1. Fields are provided in table 110 for writing the information included in the billing data, and unit 103 records the information in corresponding fields.

In addition to the fields for writing billing data information, CR/DB table 110 has fields for writing a notification receipt (NR) flag, a clearance (CLR) flag, and credit and debit information that respectively shows credit and debit amounts corresponding to billing amounts included in billing data. Entry unit 103 judges whether the billing amount shown in the amount information equates to a credit amount or a debit amount, depending on whether or not the biller ID information shown in the billing data specifies a predetermined biller (here, the home company). If the billing amount equates to a credit amount (i.e. biller ID information specifies the predetermined biller), unit 103 writes the billing amount to the credit information field, and if the billing amount equates to a debit amount (i.e. biller ID information does not specify the predetermined biller), unit 103 writes the billing amount to the debit information field.

Here, the "NR flag" is a flag set on receipt by NR unit 105 (described below) of a receipt notification sent when billing data pertaining to a full-amount receipt target is received from billee accounting device 200 (described below). In other words, this flag identifies whether or not a receipt notification has been received in relation to each piece of billing data for full-amount receipt.

Here, the "CLR flag" is a flag set by appropriation device 300 (described below) once checklist processing by device 300 has been performed. In other words, this flag shows whether or not checklist processing has been performed with respect to each piece of billing data.

FIG. 3 shows a specific example of CR/DB table 110 stored in database DB1.

FART judgment unit 104 holds specific billee information, and judges whether inputted billing data pertains to a full-amount receipt target, depending on whether the billee shown by the billee ID information included in billing data received from approval unit 102 matches a billee shown in the specific billee information. When matched, unit 104 judges that the billing data pertains to a full-amount receipt target, and transmits the billing data online to the billee using a telecommunication circuit. When not matched, unit 104 judges that the billing data does not pertain to a full-amount receipt target, and prints out the billing data. The printout is sent by mail to the billee.

Note that the biller and billee accounting devices are connected online by the telecommunication circuit.

Here, the specific billee information is a list of companies (billees) having a full-amount receipt agreement with the home company (biller).

Here, "full-amount receipt" is an agreement showing the billee's intention to accept billing amounts issued by the biller without scrutinizing the content of the billing data.

NR unit 105 receives receipt notifications sent out from billee accounting device 200 on receipt of billing data pertaining to full-amount receipt targets. Here, a receipt notification is information that includes a message showing that billing data has been received and a bill number for identifying the billing data. Unit 105 also sets the NR flag in CR/DB table 110 relating to the billing data that matches the bill number included in the receipt notification to a flag showing "received" (see NR flag of BDAT-ID information "01" in FIG. 3).

Billee Accounting Device 200

Billee accounting device 200 is constituted from a billing-data (BDAT) reception unit 201, an entry unit 202, a full-amount receipt (FAR) notification unit 203, a scrutiny-data (SDAT) generation unit 204, an approval unit 205, and an entry unit 206.

BDAT reception unit 201 receives billing data transmitted via a transmission line.

Entry unit 202 records received billing data in a credit/debit (CR/DB) table 210 stored in database DB2. Unit 202 sets a full-amount receipt (FAR) flag in table 210 when billing data is recorded.

In addition to fields for writing the information included in billing data, CR/DB table 210 has fields for writing a full-amount receipt (FAR) flag, a clearance (CLR) flag, and credit and debit information that respectively shows credit and debit amounts corresponding to billing amounts included in billing data.

Here, the "FAR flag" is a flag set when entry unit 202 records billing data received by BDAT reception unit 201 in CR/DB table 210. In other words, this flag identifies whether or not billing data for full-amount receipt has been received.

FIG. 4 shows a specific example of CR/DB table 210 stored in database DB2.

FAR-notification unit 203 notifies biller accounting device 100 that billing data has been received. This notification is conducted online in realtime on receipt of billing data.

Note that electronic mail indicating the receipt of billing data may be sent out automatically to biller accounting device 100 when billing data is received.

SDAT generation unit 204 generates scrutiny data, which is billing data whose content has been carefully examined. If an error in the billing amount, remarks or the like is revealed by the careful examination, scrutiny data results from the correction of these errors. Note that the careful examination of billing data content is performed irrespective of whether or not the billing data pertains to a full-amount receipt target.

Approval unit 205 approves scrutiny data generated by SDAT generation unit 204, based on inputs from the user. Approved scrutiny data is passed on to entry unit 206 after removing any billing data targeted for full-amount receipt.

Specifically, processing to check whether scrutiny data contains any errors is performed in approval unit 205 based on user inputs. If there are no errors, unit 205 passes the scrutiny data without alteration to entry unit 206 as approved scrutiny data, and if there is an error, scrutiny data whose content has been corrected on the basis of user inputs is passed on to entry unit 206 as approved scrutiny data.

Entry unit 206 records scrutiny data in CR/DB table 210 in database DB2.

Appropriation devices 300 & 400

Appropriation device 300 is constituted from a checklist processing-unit 3001 and a report preparation unit 3002.

Checklist processing unit 3001 performs checklist processing (described below) based on the NR flags relating to billing data written to CR/DB table 110 stored in database DB1.

Here, "checklist processing" refers to the specification of billing data targeted for full-amount receipt, based on NR flags or FAR flags relating to billing data recorded in CR/DB table 110 or 210, and to the elimination of billing amounts in the billing data from the material for use in preparing consolidated financial reports. Specifically, checklist processing refers to billing data being cleared for elimination, by setting the CLR flag that relates to the billing data to a flag showing "cleared" (see CLR flag of BDAT-ID information "01" in FIG. 3).

Report preparation unit 3002, when instructed by the user, calculates a total credit amount, a total debit amount, and an account balance for billing data whose CLR flag shows "uncleared" (i.e excluding billing data whose CLR flag shows "cleared"), based on credit and debit information written to CR/DB table 110 stored in database DB1, and prepares a consolidated financial report as shown in FIG. 5.

Here, a consolidated financial report is prepared monthly in response to a user instruction.

Appropriation device 400 is constituted from a checklist processing unit 4001 and a report preparation unit 4002.

Checklist processing unit 4001 performs checklist processing based on FAR flags relating to billing data written to CR/DB table 210 stored in database DB2.

Note that checklist processing is performed with respect to CR/DB table 110 containing the biller's billing data whenever NR unit 105 receives a receipt notification, and performed with respect to CR/DB table 210 containing the billee's billing data whenever entry unit 202 enters billing data in database DB2 and sets the corresponding FAR flag.

Appropriation device 300 finds out that NR unit 105 has received a receipt notification by appropriately monitoring the NR flags set for billing data in CR/DB table 110 stored in database DB1 (e.g. when preparing a financial report), and detecting a "received" flag.

Report preparation unit 4002, when instructed by a user, calculates a total credit amount, a total debit amount, and an account balance for billing data whose CLR flag shows "uncleared" (i.e. excluding billing data whose CLR flag shows "cleared"), based on credit and debit information written to CR/DB table 210, and prepares a consolidated financial report as shown in FIG. 6.

Here, a consolidated financial report is prepared monthly in response to a user instruction.

Since consolidated accounting for the entire group corporation can be calculated on the basis of the consolidated financial reports prepared by report preparation units 3002 and 4002, it is possible to promptly conduct accounting for the entire group corporation with credit and debit amounts based on commercial transactions between individual corporations within the group corporation excluded in advance from appropriation in consolidated accounting, and to present to investors a consolidated accounting report that reflects only commercial transactions conducted with corporations outside the group corporation.

Figure 19:
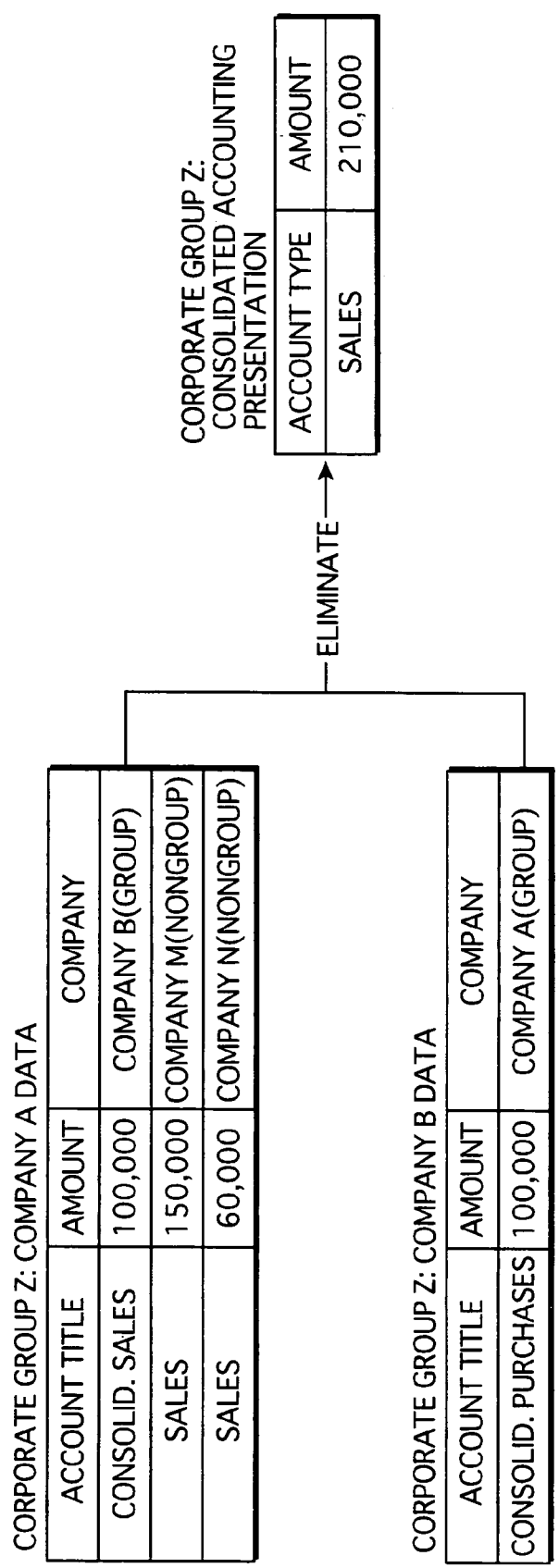
FIG. 19 schematically shows the process by which consolidated accounting for an entire group corporation is prepared, after credits and debits based on commercial transactions between individual corporations within the group corporation (i.e. credits and debits targeted for checklist processing) have been eliminated from appropriation in consolidated accounting, with respect to the overall commercial transactions undertaken by the corporations.

FIG. 19 schematically shows the process by which consolidated accounting for an entire group corporation is prepared, after credits and debits based on commercial transactions between individual corporations within the group corporation (i.e. credits and debits targeted for checklist processing) have been eliminated from appropriation in consolidated accounting, with respect to the overall commercial transactions undertaken by the corporations.

In FIG. 19, Company A and Company B form a single corporate group (here, "Corporate Group Z"), and a consolidated accounting amount for Corporate Group Z is calculated after the credit amount (i.e. the sum corresponding to "consolidated sales/" in the Account Title field of the Company A data) and debit amount (i.e. the sum corresponding to "consolidated purchases" in the Account Title field of the Company B data) based on commercial transactions between companies A and B have been eliminated from appropriation in consolidated accounting, as targets for checklist processing.

Operations

1. Biller Accounting Device 100 Operations

Figure 7:
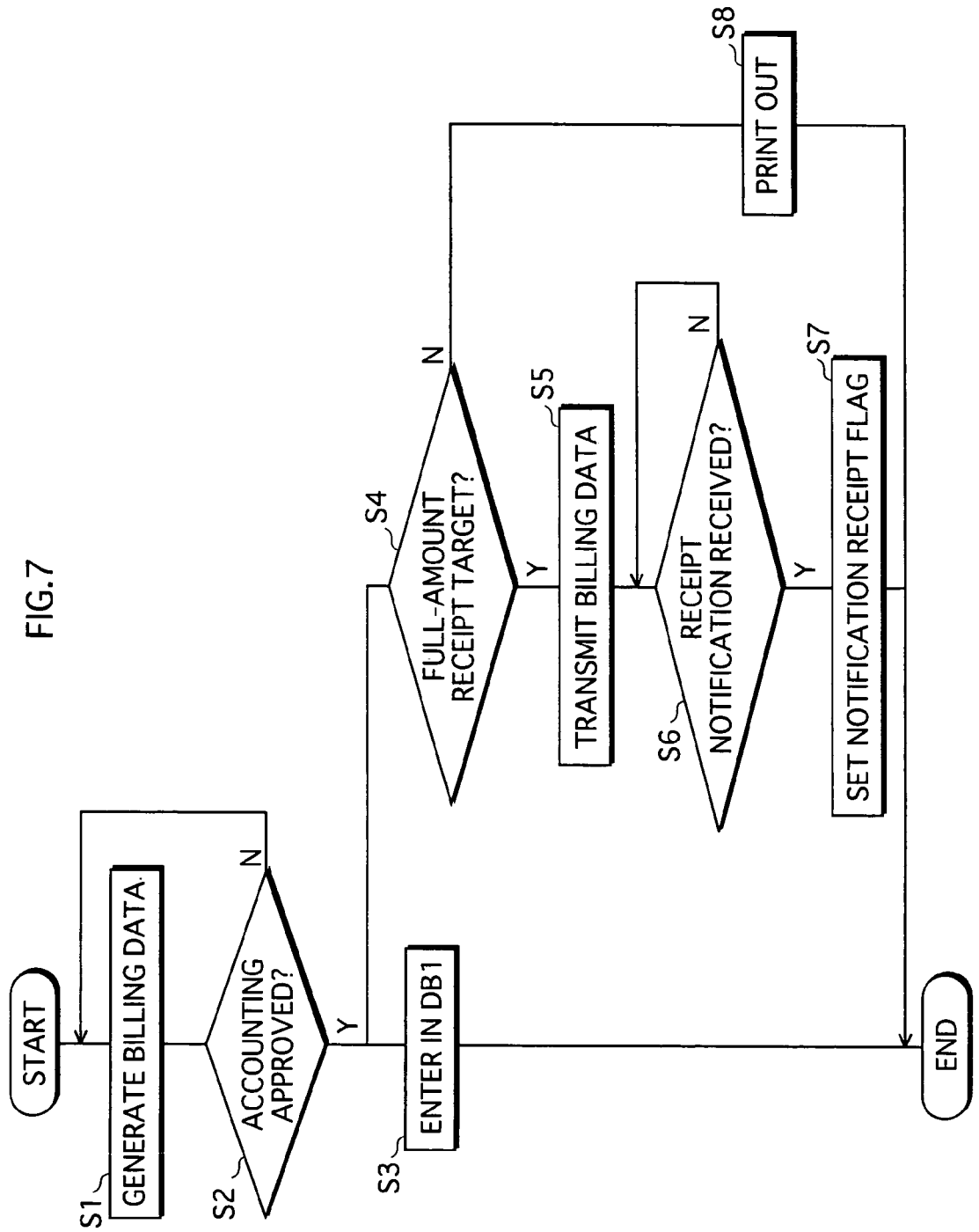
FIG. 7 shows operations preformed in a biller accounting device 100.

The operations of biller accounting device 100 are described here in accordance with FIG. 7.

Firstly, BDAT generation unit 101 generates billing data on the basis of input information such the billee, billing amount, remarks and the like from the user (S1). Note that billing data may be generated in accordance with a predetermined template. Also, ID numbers identifying individual pieces of billing data may be appended automatically or by user input.

Generated billing data is passed on to approval unit 102 for approval (judged at S2).

If approved (S2=Y), entry unit 103 writes (i.e. enters) the billing data to CR/DB table 110 stored in database DB1 (S3).

Around the time of the entry processing, the generated billing data is passed on to FART judgment unit 104, where a judgment is made as to whether the billing data pertains to a full-amount receipt target (S4).

Here, if judged to be billing data pertaining to a full-amount receipt target (S4=Y), FART judgment unit 104 transmits the billing data to billee accounting device 200 (S5).

Next, at step S6, biller accounting device 100 waits for a notification indicating the receipt of the billing data (i.e. receipt notification), which is sent by billee accounting device 200 on receipt of the transmitted billing data.

On receipt of the receipt notification (S6=Y), FART judgment unit 104 sets the NR flag that relates to the billing data corresponding to the bill number shown in the receipt notification to a flag showing "received" (S7).

FART judgment unit 104 prints out the billing when judged not to pertain to a full-amount receipt target (S8).

2. Billee Accounting Device 200 Operations

Figure 8:
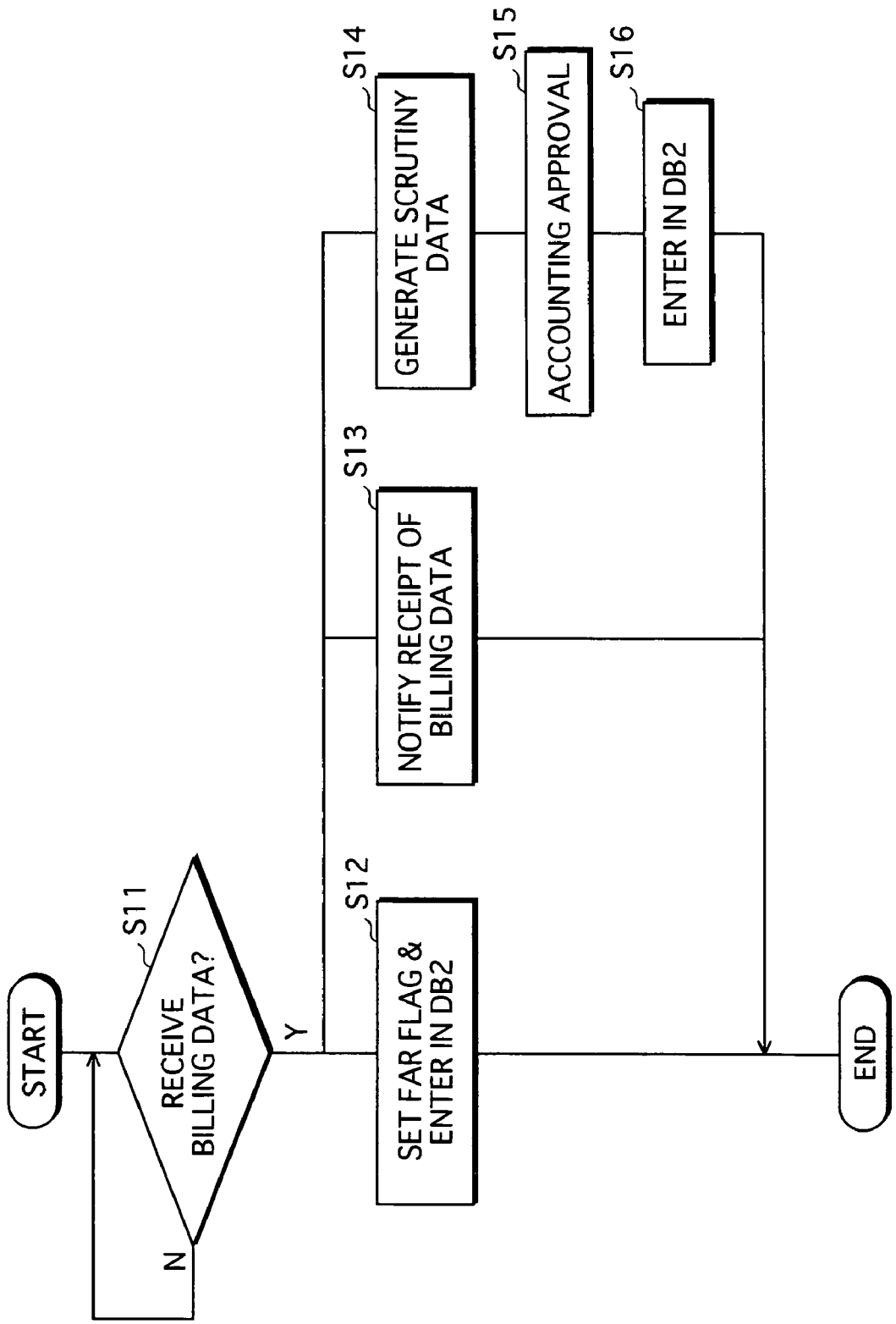
FIG. 8 shows operations performed in a billee accounting device 200.

The operations of billee accounting device 200 are described in accordance with FIG. 8.

Billee accounting device 200 waits for billing data transmitted from biller accounting device 100 to be received by BDAT reception unit 201 (S11). On receipt of billing data (S11=Y), entry unit 202 sets the FAR flag to show "received" with respect to the billing data, and writes (i.e. enters) the billing data to CR/DB table 210 in database DB2 (S12).

Around the time of the writing, FAR notification unit 203 notifies biller accounting device 100 of the receipt of the billing data (i.e. sends receipt notification) at step S13.

Also, received billing data is passed on sequentially to SDAT generation unit 204, approval unit 205, and entry unit 206 for the parallel processing of steps S12 and S13, and written (i.e. entered) to CR/DB table 210 of database DB2 (S14, S15, S16).

3. Appropriation Devices 300 & 400 Operations

Figure 9:
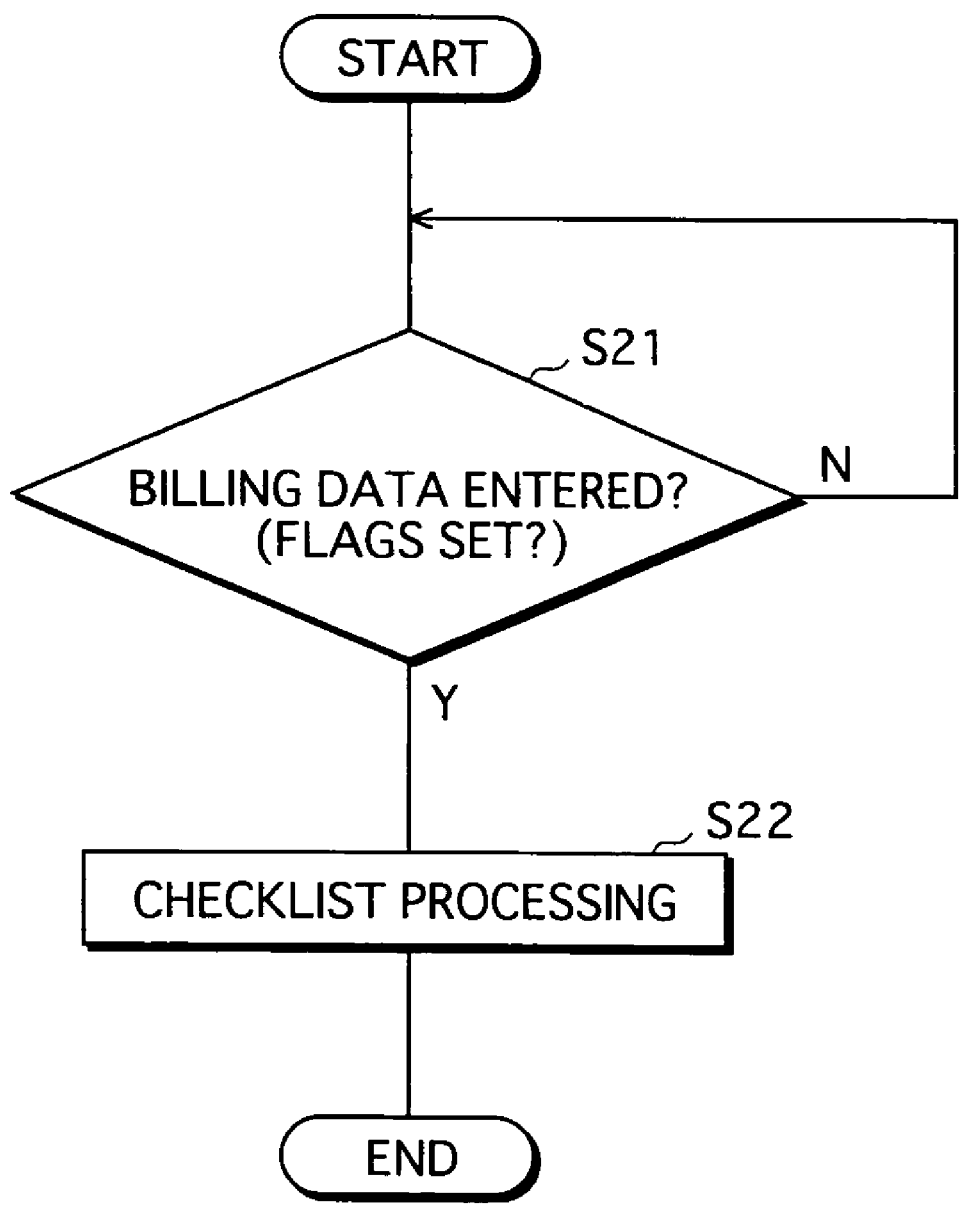
FIG. 9 shows operations performed in appropriation device 300.

The operations of appropriation devices 300 and 400 are described here in accordance with FIG. 9.

Appropriation devices 300 and 400 wait for the entry of billing data for checklist processing in databases DB1 and DB2, respectively (S21). Here, the judgment as to whether or not such billing data has been entered is performed on the basis of whether the NR flag and FAR flag in billing data to be entered have been set to "received".

When billing data for checklist processing is entered (S21=Y), checklist processing is performed with respect to CR/DB table 110 or 210 (S22).

The following description relates to an embodiment 2 of the accounting system according to the present invention.

Embodiment 2

Figure 10:
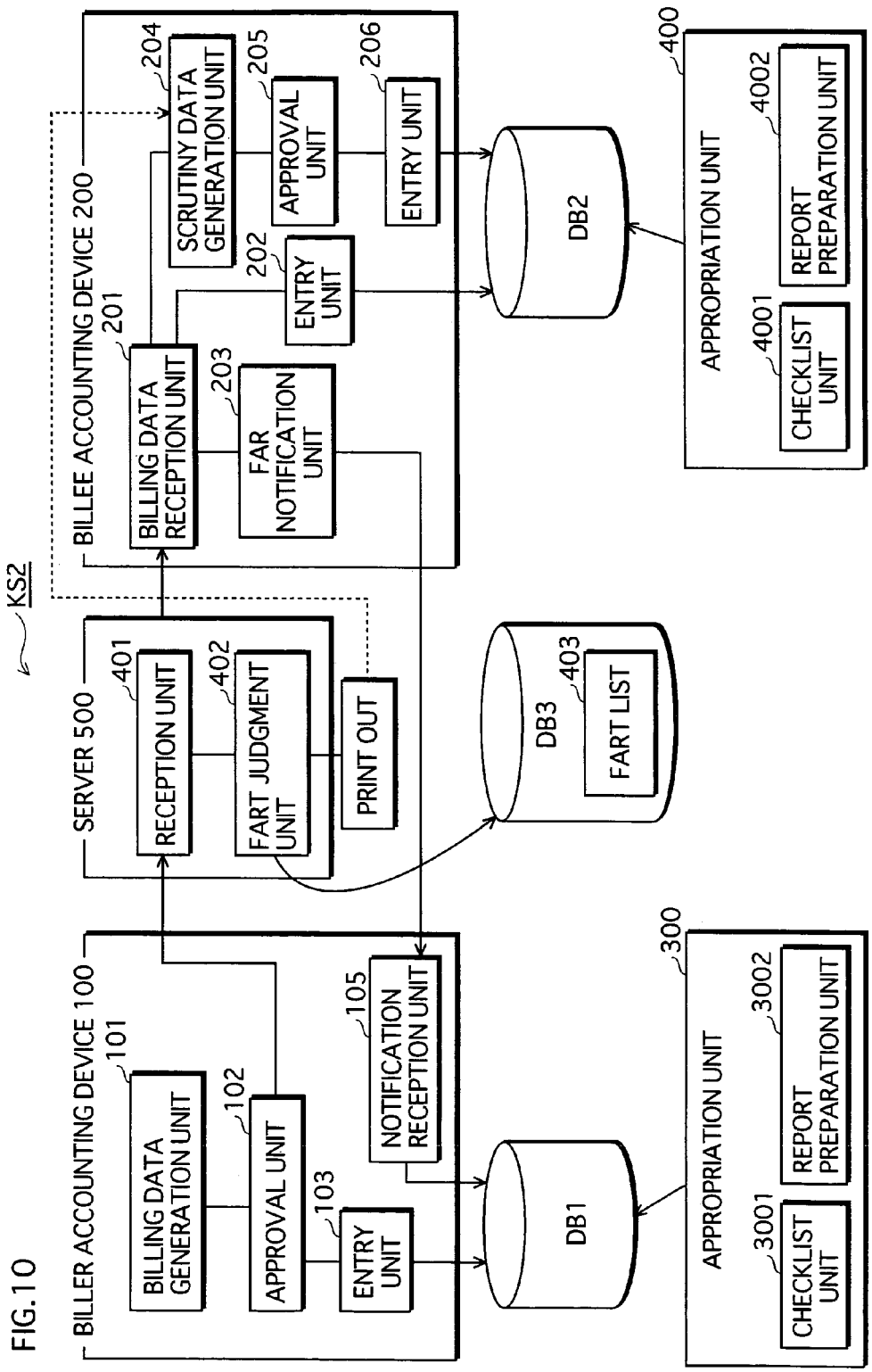
FIG. 10 is a functional block diagram of an accounting system KS2 in an embodiment 2.

FIG. 10 is a functional block diagram of an accounting system KS2 according to the present embodiment.

The basic structure, although similar to embodiment 1, differs in that the transmission of billing data from biller accounting device 100 to billee accounting device 200 is performed by a server 500, and also in that the judgment as to whether billing data pertains to a full-amount receipt target is performed on the basis of a full-amount receipt target (FART) list 403 entered in a database DB3.

Billing data passed on from approval unit 102 in biller accounting device 100 is transmitted via a transmission line, and received by a receiving unit 401 in server 500.

The received billing data is passed on to a full-amount receipt target (FART) judgment unit 402. Unit 402 judges whether the billing data pertains to a full-amount reception target, on the basis of FART list 403 entered in database DB3.

FART list 403 is, as shown in FIG. 11, a list indicating the correspondence between a biller and one or more billees having a full-amount receipt agreement with the biller.

If a full-amount receipt agreement exists with the biller, the billing data is transmitted to the billee, and if a full-amount receipt agreement does not exist with the biller, the billing data is printed out, and the printout is mailed to the billee.

The following description relates to an embodiment 3 of the accounting system according to the present invention.

Embodiment 3

Figure 12:
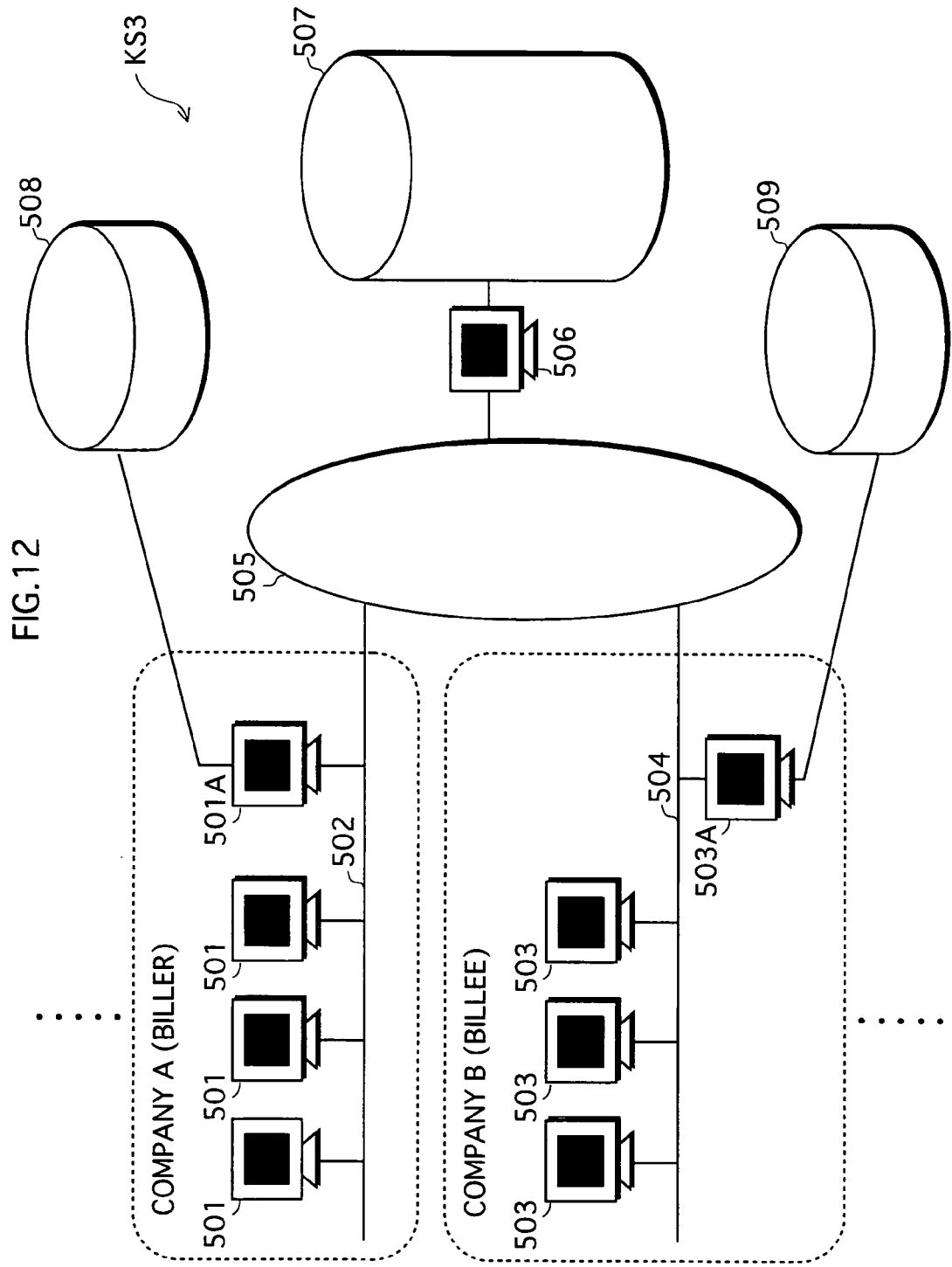
FIG. 12 shows a configuration of an accounting system KS3 pertaining to an embodiment 3.

FIG. 12 shows a configuration of an accounting system KS3 relating to the present embodiment. Accounting system KS3 is an implementation model for when the accounting system of embodiment 2 is applied to Companies A and B which each has a plurality of departments.

Accounting system KS3 is formed from a plurality of biller terminals 501, a biller master terminal 501A, a billee network 502, a plurality of billee terminals 503, a billee master terminal 503A, a billee network 504, a inter-business network 505, a server 506, and databases 507 to 509. Biller and billee terminals 501 and 503 are connected respectively to biller and billee master terminals 501A and 503A by telecommunication circuits via biller and billee networks 502 and 504.

Here, biller and billee terminals 501 and 503 equate respectively to biller and billee accounting devices 100 and 200 in embodiment 2, biller and billee master terminals 501A 503A equate respectively to appropriation devices 300 and 400 in embodiment 2, databases 507, 508 and 509 equate respectively to databases DB3, DB1 and DB2 in embodiment 2, and server 506 equates to server 500 in embodiment 2.

Biller terminals 501, which are provided for every department in the business that issues bills, are computers that include a display monitor, a keyboard, and a mouse. These terminals function to display screens, such as the screen shown in FIG. 13, in response to screen display instructions from the user, and when various types of data relating to the different items on the screen shown in FIG. 13 are inputted by a user, the terminals generate billing data on the basis of the input data.

Biller network 502 is a transmission line for transmitting/receiving billing and other types of data between individual terminals, and between the terminals and the master terminal.

Billee terminals 503, which are provided for every department in the business that issues bills, are computers that include a display monitor, a keyboard, and a mouse.

Billee network 504 is a transmission line for transmitting/receiving billing and other types of data between individual terminals, and between the terminals and the master terminal.

Inter-business network 505 is a transmission line for transmitting/receiving data between terminals 501/master terminal 501A and terminals 503/master terminal 503A.

FART list 403 in embodiment 2 has been entered in database 507.

Server 506 judges whether billing data transmitted via inter-business network 505 pertains to a full-amount receipt target. Specifically, server 506 judges whether the billee of billing data from a terminal 501 is a business operation having a full-amount receipt agreement by referring to FART list 403 entered in database 507. If the billee has such an agreement, server 506 transmits the billing data to the business operation via inter-business network 505, and if the billee does not have such an agreement, server 506 prints out the billing data, and the printout is mailed to the billee.

Database 508 stores billing data generated by the biller and journal data that equates to CR/DB table 110 in embodiment 2.

Database 509 stores billing data received by the billee, and journal data that equates to CR/DB table 210 in embodiment 2.

The following description relates to the realization, in accounting system KS3, of processing performed by biller accounting device 100 in embodiment 2.

Firstly, a biller terminal 501 equating to BDAT generation unit 101 generates billing data based on data inputted by a user via the screen shown in FIG. 13, and transmits the generated data to a biller terminal 501 equating to approval unit 102 via biller network 502 for approval.

Here, generated billing data includes, specifically, information such as a biller business operation code ("BILLER BOP CODE"), a bill number ("BILL NO."), a biller department/person-in-charge ("BILLER DEPT./PIC" ), a billing date ("BILL DATE"), a billee business operation code ("BILLEE BOP CODE"), billee department/person-in-charge ("BILLEE DEPT./PIC"), a bill amount ("AMOUNT"), a billing description ("DESC."), and the like.

FIG. 14A shows a specific example of generated billing data.

The biller terminal 501 equating to approval unit 102 executes similar processing to that performed by approval unit 102 described in embodiment 1 with respect to received billing data, and transmits approved billing data to another biller terminal 501 (equating to entry unit 103) and server 506 via biller network 502 and inter-business network 505.

The biller terminal 501 equating to approval unit 102 also receives inputs from the user of billing data whose biller is another company, and transmits the received billing data to the biller terminal 501 equating to entry unit 103 via biller network 502.

The biller-terminal 501 equating to entry unit 103 transmits the received billing data to biller master terminal 501A via biller network 502, and requests the generation of journal data equating to the billing data parts of CR/DB table 110.

A biller terminal 501 equating to NR unit 105, on receipt of a notification indicating the receipt of billing data relating to a full-amount receipt agreement target, transmitted from a billee terminal 503 via billee network 504 and inter-business network 505, together with the bill number of the billing data, notifies biller master terminal 501A of the received bill number via biller network 502, and requests that the corresponding FAR flag in the journal data be set to "received".

Note that, as mentioned above, it is possible to provide a biller terminal 501 that corresponds to a plurality of the components of biller accounting device 100, instead of separately providing biller terminals 501 that equate to the individual components.

The following description relates to the realization, in accounting system KS3, of processing performed by server 500 in embodiment 2.

Server 506, on receipt of approved billing data, judges whether the billee is a full-amount receipt agreement target by referring to FART list 403 stored in database 507. If judged in the affirmative, server 506 transmits the billing data to a billee terminal 503 equating to BDAT reception unit 201 in the accounting department of the billee via inter-business network 505 and billee network 504, and if judged in the negative, server 506 prints out the billing data.

The following description relates to the realization, in accounting system KS3, of processing performed by billee accounting device 200 in embodiment 2.

The billee terminal 503 equating to BDAT reception unit 201, on receipt of the billing data transmitted from server 506, appends a FAR flag showing "received" and a full-amount receipt (FAR) number to the billing data, and transmits this billing data (hereinafter "receipt data") to billee terminals 503 equating respectively to FAR notification unit 203, entry unit 202, and SDAT generation unit 204 via billee network 504.

FIG. 15 shows a specific example of billing data displayed on the display monitor of the billee terminal 503 equating to BDAT reception unit 201, on receipt of billing data relating to a full-amount receipt agreement target, transmitted from server 506.

FIG. 14B shows a specific example of receipt data.

Note that the FAR flag and the FAR number may be inputted by a user via a screen (e.g. inputs to the items marked by the arrows on the input screen shown in FIG. 16), rather than being automatically inputted.

The billee terminal 503 equating to FAR notification unit 203, on receipt of the receipt data, transmits a notification indicating the receipt and the bill number of the receipt data to the biller terminal 501 equating to NR unit 105 via billee network 504 and inter-business network 505.

Here, the above notification may be conducted, for example, by transmitting an email as soon as the receipt data is received.

The billee terminal 503 equating to entry unit 202 transmits the-receipt data to billee master terminal 503A via billee network 504, and requests the generation of journal data equating to the billing data parts of CR/DB table 210.

The billee terminal 503 equating to SDAT generation unit 204 transmits the receipt data or other billing data inputted by a user (i.e. not relating to a full-amount receipt agreement target) that has been carefully examined (hereinafter "transaction data") to a billee terminal 503 equating to approval unit 205 via billee network 504.

The billee terminal 503 equating to approval unit 205 approves received transaction data based on inputs from the user, and appends to approved transaction data, information identifying the person or entity that approved the data.

FIG. 14C shows a specific example of transaction data after approval.

The billee terminal 503 equating to approval unit 205 furthermore transmits approved transaction data not relating to a full-amount receipt agreement target to a billee terminal 503 equating to entry unit 206 via billee network 504.

The billee terminal 503 equating to entry unit 206 transmits the received transaction data to billing master terminal 503A via billing network 504, and requests the generation of journal data equating to the billing data parts of CR/DB table 210.

Note that, as mentioned above, it is possible to provide a billee terminal 503 that corresponds to a plurality of the components of billee accounting device 200, instead of separately providing billee terminals 503 that equate to the individual components.

The following description relates to the realization, in accounting system KS3, of processing performed by appropriation devices 300 and 400 in embodiment 2.

The following description relates to processing in billee master terminal 501A that equates to processing performed by appropriation device 300.

Biller master terminal 501A, in response to a request from the biller terminal 501 equating to entry unit 103, generates journal data based on received billing data, and enters the generated data in database 508.

Here, "journal data" includes information relating to a biller business operation code ("BILLER BOP CODE"), a bill number ("BILL NO."), a biller department/person-in-charge ("DEPT./PIC"), a billing date ("BILL DATE"), billee business operation code ("BILLEE BOP CODE"), a biller department/person-in-charge ("DEPT./PIC"), a billing amount ("AMOUNT"), a billing description ("DESC."), a full-amount receipt flag ("FAR FLAG"), a clearance flag ("CLR FLAG"), and credit ("CR") and debit ("DB") amounts.

Furthermore, biller master terminal 501A sets the FAR flag in the journal data to "received" in response to a request from the biller terminal 501 equating to NR unit 105, and performs checklist processing based on the FAR flags of billing data written to the journal data (i.e. processing to clear the billing data for elimination from appropriation in consolidated accounting, by setting the CLR flag of billing data whose FAR flag shows "received" to a flag showing "cleared").

FIG. 17 shows a specific example of journal data generated by biller master terminal 501A.

Also, biller master terminal 501A, when instructed by a user, calculates total credit and debit amounts, and an account balance for billing data whose CLR flag shows "uncleared" (i.e. excluding billing data whose CLR flag shows "cleared") based on information relating to credit and debit amounts written to journal data stored in database 508, and prepares a consolidated financial report such as shown in FIG. 5.

The following description relates to processing in billee master terminal 503A that equates to processing performed by appropriation device 400.

Billee master terminal 503A, in response to a request from the biller terminal 503 equating to entry unit 202, generates journal data based on received receipt data, sets the FAR flag of the generated journal data to "received", enters the journal data in database 509, and performs checklist processing based on the FAR flags of billing data written to the journal data (i.e. processing to clear billing data for elimination from appropriation in consolidated accounting, by setting the CLR flag of billing data whose FAR flag shows "received" to a flag showing "cleared").

Also, billee master terminal 503A, in response to a request from the billee terminal 503 equating to entry unit 206, generates journal data based on received transaction data, and enters the generated data in database 509.

FIG. 18 shows a specific example of journal data generated by billee master terminal 503A.

Also, billee master terminal 503A, when instructed by a user, calculates total credit and debit amounts, and an account balance for billing data whose CLR flag shows "uncleared" (i.e. excluding billing data whose CLR flag shows "cleared"), based on information relating to credit and debit amounts written to journal data stored in database 509, and prepares a consolidated financial report such as shown in FIG. 6.

Checklist processing is performed on the basis of the CLR flag settings in journal data entered as described above, and a consolidated financial report is prepared after eliminating transactions conducted between Companies A and B. As a result, consolidated financial reports are prepared with inter-business credit and debit amounts that relate to the same group (i.e. consolidated accounting target) canceling each other out.

Variations

The present invention can be similarly implemented with the following variations so long as the category to which the technological ideas behind the invention belong is maintained.

The databases may be shared.

The functions of the servers are described above as having an independent structure to the biller and billee accounting devices, although these functions may be provided in the biller and/or billee accounting devices.

In the above embodiments, the billee is able to identify billing data that pertains to a full-amount receipt target by the fact that such billing data is transmitted to the billee via a transmission line, while billing data not pertaining to a full-amount receipt target is printed out and mailed to the billee. However, it is also possible for the billee to identify whether billing data pertains to a full-amount receipt target, by appending ID information to billing data indicating that the billing data pertains to a full-amount receipt target.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An accounting system comprising a bill-issuing device and a bill-receiving device, the bill-issuing device being connected to a database and including:

a first receiving unit operable to sequentially receive input of (i) billing data for appropriation in consolidated accounting and (ii) billing data not for appropriation in consolidated accounting;

an entry unit operable to enter the received billing data in the database;

an extraction unit operable to extract billing data not for appropriation from the received billing data;

an output unit operable to output the extracted billing data to the bill-receiving device; and a receipt notification receiving unit operable to receive a receipt notification that includes an identifier of the billing data not for appropriation received by the bill-receiving device and a message indicating the receipt of the billing data not for appropriation by the bill-receiving device, the receipt notification being outputted from the bill-receiving device to the bill-issuing device if the bill-receiving device has received the billing data not for appropriation;

the bill-receiving device including:

a second receiving unit operable to receive the billing data outputted from the bill-issuing device; and a notification unit operable, upon receipt of the billing data not for appropriation by the second receiving unit, to notify the bill-issuing device of the receipt of the billing data not for appropriation by out-putting, to the bill-issuing device, the receipt notification on the billing data not for appropriation, wherein the receipt notification receiving unit, upon receipt of the receipt notification outputted from the notification unit, adds a receipt notification reception identifier to, among the plurality of the billing data entered in the database, the billing data indicated by the identifier included in the received receipt notification, the receipt notification reception identifier indicating the receipt of the receipt notification, and;

the bill-issuing device further including:

an exclusion unit operable to exclude, the exclusion unit excludes, among the plurality of the billing data entered in the database, the billing data to which the receipt notification reception identifier is added.

2. The accounting system of claim 1 further comprising an appropriation device means for performing a checklist processing including elimination of billing amounts between related companies subject to consolidated financial reporting requirements and for preparation of a consolidated financial report based on the billing data that 5 remains after the elimination of related company billing amounts.

3. The accounting system of claim 1 further comprising a calculation device operable to calculate a consolidated accounting amount, based on the billing data entered in the database not excluded by the exclusion unit from being appropriated.

4. The accounting system of claim 3, wherein the bill-issuing device and the bill-receiving device are connected by a telecommunication circuit, the extraction unit includes a judgment subunit operable to judge whether received billing data is for appropriation, and the output unit includes an online transmission subunit operable to transmit online to the bill-receiving device, only billing data extracted as billing data not for appropriation.

5. The accounting system of claim 4, wherein the database stores an exclusion list showing a correspondence between a biller and a billee that are not targeted for consolidated accounting, and the judgment subunit judges received billing data to be not for appropriation if the biller and billee of the billing data are shown in the exclusion list.

6. The accounting system of claim 4, wherein the notification unit performs the notification online in realtime.

7. An accounting system comprising a bill-issuing device connected to a first database, a server connected to a second database that stores an exclusion list showing a correspondence between a biller and a billee that are not targeted for consolidated accounting, and a bill-receiving device, the bill-issuing device including:

a first receiving unit operable to sequentially receive input of (i) billing data for appropriation in consolidated accounting and (ii) billing data not for appropriation in consolidated accounting;

a first transmission unit operable to transmit received billing data to the server; an entry unit operable to enter received billing data in the first database;

a receipt notification receiving unit operable to receive a receipt notification that includes an identifier of the billing data not for appropriation received by the bill-receiving device and a message indicating the receipt of the billing data not for appropriation by the bill-receiving device, the receipt notification being outputted from the bill-receiving device to the bill-issuing device if the bill-receiving device has received the billing data not for appropriation;

the server including:

a second receiving unit operable to receive the billing data transmitted from the bill-issuing device;

a judgment unit operable to judge whether the received billing data is for appropriation, depending on whether the biller and billee of the billing data are shown in the exclusion list; and a second transmission unit operable to transmit the received billing data to the bill-receiving device if judged to be not for appropriation, and the bill-receiving device including:

a third receiving unit operable to receive the billing data transmitted from the server; and a notification unit operable, upon receipt of the billing data not for appropriation by the second receiving unit, to notify the bill-issuing device of the receipt of the billing data not for appropriation by outputting, to the bill-issuing device, the receipt notification on the billing data not for appropriation, wherein the receipt notification receiving unit, upon receipt of the receipt notification outputted from the notification unit, adds a receipt notification reception identifier to, among the plurality of the billing data entered in the database, the billing data indicated by the identifier included in the received receipt notification, the receipt notification reception identifier indicating the receipt of the receipt notification, and;

the bill-issuing device further including:

an exclusion unit operable to exclude the exclusion unit excludes, among the plurality of the billing data entered in the database, the billing data to which the receipt notification reception identifier is added.

8. The accounting system of claim 7 further comprising a calculation device operable to calculate a consolidated accounting amount, based on the billing data entered in the first database not excluded by the exclusion unit from being appropriated.

9. The accounting system of claim 8, wherein the bill-issuing device, the server, and the bill-receiving device are connected by a telecommunication circuit, and the second transmission unit transmits online to the bill-receiving device, only billing data judged to be not for appropriation.

10. The accounting system of claim 9, wherein the notification unit performs the notification online in realtime.

11. The accounting system of claim 7, wherein the bill-issuing device and the bill-receiving device are each a plurality of communication terminals operable to intercommunicate via a telecommunication circuit.

12. The accounting system of claim 7, wherein the bill-issuing device further includes a calculation unit operable to calculate a consolidated accounting amount, based on the billing data entered in the first database not excluded by the exclusion unit from being appropriated.

13. A method used by a bill-issuing device that is connected to a database and included in an accounting system that further includes a bill-receiving device, comprising the steps of:

receiving input of (i) billing data for appropriation in consolidated accounting and (ii) billing data not for appropriation in consolidated accounting;

entering the received billing data in the database;

extracting billing data not for appropriation from the received billing data;

outputting the extracted billing data to the bill-receiving device; and receiving a receipt notification that includes an identifier of the billing data not for appropriation received by the bill-receiving device and a message indicating the receipt of the billing data not for appropriation by the bill-receiving device, the receipt notification being outputted from the bill-receiving device to the bill-issuing device if the bill-receiving device has received the billing data not for appropriation;

Wherein upon the receipt of the receipt notification which relates to the received billing data and is outputted from the bill-receiving device, the step of receiving the receipt notification adds a receipt notification reception identifier to, among the plurality of the billing data entered in the database, the billing data indicated by the identifier included in the received receipt notification, the receipt notification reception identifier indicating the receipt of the receipt notification;

the method further comprising the step of:

excluding, among the plurality of the billing data entered in the database, the billing data to which the receipt notification reception identifier is added.

14. A computer-readable recording medium having recorded thereon a bill-issuing program with executable instructions for causing a bill-issuing device to execute a biller accounting process, the bill-issuing device being connected to a database and included in an accounting system which further includes a bill-receiving device, the biller accounting process comprising the steps of:

receiving input of (i) billing data for appropriation in consolidated accounting and (ii) billing data not for appropriation in consolidated accounting; entering the received billing data in the database; extracting billing data not for appropriation from the received billing data; outputting the extracted billing data to the bill-receiving device; receiving a receipt notification that includes an identifier of the billing data not for appropriation received by the bill-receiving device and a message indicating the receipt of the billing data not for appropriation by the bill-receiving device, the receipt notification being outputted from the bill-receiving device to the bill-issuing device if the bill-receiving device has received the billing data not for appropriation;

Wherein upon the receipt of the receipt notification which relates to the received billing data and is outputted from the bill-receiving device, the step of receiving the receipt notification adds a receipt notification reception identifier to, among the plurality of the billing data entered in the database, the billing data indicated by the identifier included in the received receipt notification, the receipt notification reception identifier indicating the receipt of the receipt notification, and the biller accounting process comprising the step of:

excluding, among the plurality of the billing data entered in the database, the billing data to which the receipt notification reception identifier is added.

15. A bill-issuing device included in an accounting system comprising the bill-issuing device and a bill-receiving device, the bill-issuing device being connected to a database and including:

a first receiving unit operable to sequentially receive input of (i) billing data for appropriation in consolidated accounting and (ii) billing data not for appropriation in consolidated accounting;

an entry unit operable to enter the received billing data in the database; an extraction unit operable to extract billing data not for appropriation from the received billing data;

an output unit operable to output the extracted billing data to the bill-receiving device;

a receipt notification receiving unit operable to receive a receipt notification that includes an identifier of the billing data not for appropriation received by the bill-receiving device and a message indicating the receipt of the billing data not for appropriation by the bill-receiving device, the receipt notification being outputted from the bill-receiving device to the bill-issuing device, if the bill-receiving device has received the billing data not for appropriation;

wherein the receipt notification receiving unit, upon the receipt of the receipt notification which relates to the received billing data is outputted from the bill-receiving device, adds a receipt notification reception identifier to, among the plurality of the billing data entered in the database, the billing data indicated by the identifier included in the received receipt notification, the receipt notification reception identifier indicating the receipt of the receipt notification, and the bill-issuing device further including:

an exclusion unit operable to exclude, the exclusion unit excludes, among the plurality of the billing data entered in the database, the billing data to which the receipt notification reception identifier is added.

* * * * *